United States Patent [19]
Anderson et al.

[11] 3,821,380
[45] June 28, 1974

[54] 2-ALKYLTHIO-4,6-DIAMINO-5-PYRIMIDINESULFONAMIDES AS ANTI-HYPERTENSIVES

[75] Inventors: Paul L. Anderson, Dover; Robert E. Manning, Mountain Lakes, both of N.J.

[73] Assignee: Sandoz-Wander, Inc., Hanover, N.J.

[22] Filed: Aug. 21, 1972

[21] Appl. No.: 282,317

Related U.S. Application Data

[63] Continuation-in-part of Ser. No. 62,660, Aug. 10, 1970, abandoned.

[52] U.S. Cl. .............................. 424/251, 424/248
[51] Int. Cl. ............................................ A61k 27/00
[58] Field of Search ........................... 424/251, 248

[56] References Cited
UNITED STATES PATENTS
3,553,198  1/1971  Santilli et al. ................ 260/256.5 R OTHER PUBLICATIONS
Chem. Abstracts Subject Index, 59:2018 s (in reference to J. Org. Chem. 28, 8, pp. 1994–1998 (1963).

*Primary Examiner*—Albert T. Meyers
*Assistant Examiner*—Norman A. Drezin

[57] ABSTRACT

2-Alkylthio substituted 4,6-diamino-5-pyrimidinesulfonamides, e.g., 4,6-diamino-2-methylthio-N-methyl-5-pyrimidinesulfonamide, are prepared by treating 4,6-diamino-2-methylthio-5-pyrimidinesulfonyl halide with primary or secondary amines and are useful as anti-hypertensives.

6 Claims, No Drawings

2-ALKYLTHIO-4,6-DIAMINO-5-PYRIMIDINESULFONAMIDES AS ANTI-HYPERTENSIVES

This application is a continuation-in-part of copending U.S. Pat. application Ser. No. 62,660, filed Aug. 10, 1970 now abandoned.

This invention relates to alkylthio substituted-5-pyrimidinesulfonamides, their preparation and their use as hypotensive/anti-hypertensive agents.

The compounds of this invention may be represented by the following formula:

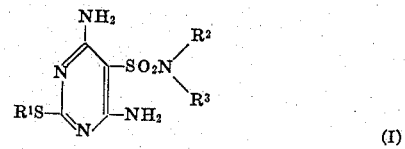

where
R$^1$ represents lower alkyl, i.e., alkyl having 1 to 4 carbon atoms, e.g., methyl, ethyl, isopropyl, and the like; and
R$^2$ and R$^3$ each independently represent hydrogen; alkyl, having 1 to 8 carbon atoms, e.g., methyl, ethyl, propyl, octyl and the like; lower alkenyl, i.e., alkenyl having 3 to 5 carbon atoms, e.g., allyl, methallyl and the like; phenyl or
R$^2$ and R$^3$ together with N represent

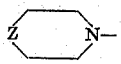

where
Z is -O- or

and
R$^4$ represents hydrogen, lower alkyl, as defined above, ω-hydroxy lower alkyl, i.e., ω-hydroxylower alkyl having 2 to 4 carbon atoms, e.g., β-hydroxyethyl, γ-hydroxypropyl and the like; or lower alkanoyl, i.e., alkanoyl having 2 to 4 carbon atoms, e.g., acetyl, propionyl and the like, or pharmaceutically acceptable acid additions salts thereof.

The compounds of formula (I) are prepared in accordance with the following reaction scheme:

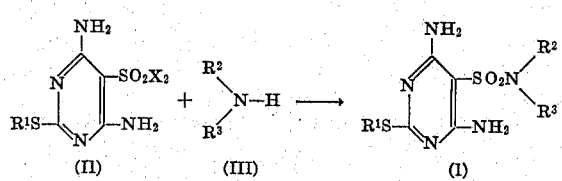

where
X represents halo having an atomic weight of about 35 to 80; and
R$^1$, R$^2$, R$^3$ and the proviso are as set out above.

The compounds of formula (I) are prepared by treating a 4,6-diamino-2-alkylthio-5-pyrimidinesulfonyl halide of formula (II) with an amine of formula (III). Although it is not necessary that the reaction be carried out in a solvent, it is preferred that an inert hydroxylic solvent such as water or lower alkanol or, where feasible, an excess of amine (III) be used. The temperature at which the reaction is run is not critical although it is preferred that temperatures between room temperature and the reflux temperature of the reaction medium be used. The product is recovered by conventional means, e.g., evaporation.

Many of the acid halides of formula II are known and are prepared by methods disclosed in the literature. The acid halides of formula II not specifically disclosed in the prior art can be prepared by known methods for acylating organic acids, e.g., by treating the acids corresponding to the acid halides (II) with an inorganic acid halides such as sulfonyl chloride, phosphorous oxychloride and the like. The acids corresponding to the acid halides (II) are either known or can be prepared from known starting materials by methods disclosed in the literature.

Many of the compounds of formulas (III) are also known and can be prepared by methods disclosed in the literature. The compounds of formula (III) not specifically disclosed in the literature can be prepared by analogous methods from known starting materials.

The compounds of formula (I) are useful because they possess pharmacological activity in animals. In particular, the compounds are useful as hypotensive/anti-hypertensive agents, as indicated by their activity in renal hypertensive rats given 100 mg/kg of active compound using the techniques of A. Grollman (Proc. Soc. Exptl. Biol. and Med. 57 : 102, 1944) and indirectly measuring the blood pressure from the caudal artery in the tail using a pneumatic pulse transducer.

When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, the compounds (I) may be similarly administered in the form of their non-toxic pharmaceutically acceptable acid addition salts. Such salts possess the same order of activity as the free base, are readily prepared by reacting the base with an appropriate acid and accordingly, are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate, and the like.

In general, satisfactory results are obtained when these compounds are administered as a hypotensive/anti-hypertensive agent at a daily dosage of about 2.0 milligrams to about 250 milligrams per kilogram of animal body weight. This daily dosage is preferably administered 2 to 4 times a day, or in sustained release form. For most large mammals, such as primates, the total daily dosage is from about 150 milligrams to about 1,000 milligrams. Dosage forms suitable for internal use comprise from about 37.5 milligrams to about 500 milligrams of the active compound in intimate admixture with a solid or liquid pharmaceutically acceptable carrier or diluent.

EXAMPLE 1

4,6-DIAMINO-2-METHYLTHIO-N-METHYL-5-PYRIMIDINESULFONAMIDE

To 30.4 g of 4,6-diamino-2-methylthio-5-pyrimidinesulfonic acid is added 114 ml of phosphorous oxychloride. The mixture is then refluxed for 1 hour, after which it is cooled to about 25° C. The excess phosphorous oxychloride is distilled off under reduced pressure to yield 4,6-diamino-2-methylthio-5-pyrimidinesulfonyl chloride.

The syrupy 4,6-diamino-2-methylthio-5-pyrimidinesulfonyl chloride is slowly added to 500 ml of 40 percent aqueous methylamine with stirring and cooling in an ice bath. The solid, which precipitates, is filtered, washed with cold water and dried. The product obtained is 4,6-diamino-2-methylthio-N-methyl-5-pyrimidinesulfonamide, mp 140° to 145° C.

When diethylamine, diallylamine or aniline is used in place of methylamine in the process of this example, there is obtained 4,6-diamino-2-methylthio-N,N-diethylamino-5-pyrimidinesulfonamide; 4,6-diamino-2-methylthio-N,N-diallylamino-5-pyrimidinesulfonamide or 4,6-diamino-2-methylthio-N-anilino-5-pyrimidinesulfonamide, respectively.

EXAMPLE 2

4,6-DIAMINO-2-METHYLTHIO-5-(4-MORPHOLINESULFONYL)PYRIMIDINE

Following the procedure of Example 1 but using morpholine in place of the methylamine used therein, there is obtained 4,6-diamino-2-methylthio-5-(4-morpholinesulfonyl)pyrimidine.

Following the above procedure but using piperazine, N-methyl-piperazine, N-($\beta$-hydroxyethyl)-piperazine or N-acetyl-piperazine in place of the morpholine used therein, there is obtained 4,6-diamino-2-methylthio-5-(1-piperazinylsulfonyl)pyrimidine; 4,6-diamino-2-methylthio-5-[1-(4-methyl)-piperazinylsulfonyl]-pyrimidine; 4,6-diamino-2-methylthio-5-[1-(4-$\beta$-hydroxy-ethyl)piperazinylsulfonyl]pyrimidine; or 4,6-diamino-2-methylthio-5-[1-(4-acetyl)-piperazinylsulfonyl]pyrimidine, respectively.

The above 4,6-diamino-2-methylthio-5-(4-morpholinesulfonly)pyrimidine is dissolved in methanol and hydrogen chloride gas is bubbled through the solution for ½ hour at room temperaure. The product obtained as a precipitate is 4,6-diamino-2-methylthio-5-(4-morpholinesulfonyl)pyrimidine hydrochloride.

EXAMPLES 3 and 4

TABLETS AND CAPSULES SUITABLE FOR ORAL ADMINISTRATION

Tablets and capsules containing the ingredients indicated below may be prepared by conventional techniques and are useful in treating hypertension in animals at a dose of one tablet or capsule 2 to 4 times a day.

| | | |
|---|---|---|
| 4,6-diamino-2-methylthio-N-methyl-5-pyrimidinesulfonamide | 100 | 100 |
| tragacanth | 10 | — |
| lactose | 147.5 | 200 |
| corn starch | 25 | |
| talcum | 15 | |
| magnesium stearate | 2.5 | |
| Total | 300 mg. | 300 mg. |

Similarly, tablets and capsules may be prepared using each of the other compounds of examples 1 and 2 as the active ingredient in place of the above 4,6-diamino-2-methylthio-N-methyl-5-pyrimidinesulfonamide in treating hypertension in animals at the same dosage level.

EXAMPLES 5 and 6

STERILE SUSPENSION FOR INJECTION AND ORAL LIQUID SUSPENSION

The following pharmaceutical compositions are formulated with the indicated amount of active agent using conventional techniques. The injectable suspension and the oral liquid suspension represent formulations useful as unit doses and may be administered in the treatment of hypertension in animals. The injectable suspension is suitable for administration once a day whereas the oral liquid suspension is suitably administered 2 to 4 times per day for this purpose.

| Ingredients | Weight (mg) sterile injectable suspension | oral liquid suspension |
|---|---|---|
| 4,6-diamino-2-methylthio-N-methyl-5-pyrimidinesulfonamide | 100 | 100 |
| sodium carboxy methylcellulose U.S.P. | 1.25 | 12.5 |
| methyl cellulose | 0.4 | — |
| polyvinylpyrrolidone | 5 | — |
| lecithin | 3 | — |
| benzyl alcohol | 0.01 | — |
| magnesium aluminum silicate | — | 47.5 |
| flavor | — | q.s. |
| color | — | q.s. |
| methyl paraben, U.S.P. | — | 4.5 |
| propyl paraben, U.S.P. | — | 1.0 |
| polysorbate 80 (e.g. Tween 80), U.S.P. | — | 5 |
| sorbitol solution, 70%, U.S.P. | — | 2,500 |
| buffer agent to adjust pH for desired stability | q.s. | q.s. |
| water | for injection q.s. to 1 ml. | q.s. to 5 ml. |

Similarly, injectable suspensions and oral liquid suspensions may be prepared using each of the other compounds of examples 1 and 2 as the active ingredient in place of the above 4,6-diamino-2-methylthio-N-methyl-5-pyrimidinesulfonamide in treating hypertension in animals at the same dosage level.

What is claimed is:

1. A method of treating hypertension which comprises administering to a mammal in need of said treatment as anti-hypertensive effective amount of a compound of the formula:

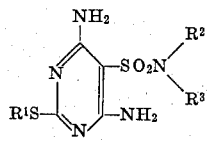

where
R$^1$ is lower alkyl; and
R$^2$ and R$^3$ each independently is hydrogen, alkyl having 1 to 8 carbon atoms, lower alkenyl, phenyl or R$^2$ and R$^3$ together with N is

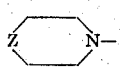

where
Z is -O-or

and
R$^4$ is hydrogen, lower alkyl, ω-hydroxy lower alkyl, or lower alkanoyl or a pharmaceutically acceptable acid addition salt thereof.

2. A method of treating hypertension according to claim 1 wherein the compound is administered at a daily dosage of from about 150 milligrams to about 1,000 milligrams.

3. A method of treating hypertension according to claim 1 wherein the compound is administered in a unit dosage form comprising said compound to the extent of from about 37.5 milligrams to about 500 milligrams per unit dosage.

4. a method of treating hypertension according to claim 1 in which the compound is 4,6-diamino-2-methylthio-N-methyl-5-pyrimidinesulfonamide.

5. A composition for the treatment of hypertension in mammals in the form of a tablet for oral administration comprising a solid pharmaceutically acceptable carrier and about 37.5 milligrams to about 500 milligrams of a compound of the formula

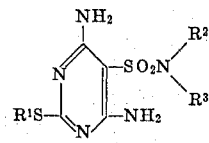

wherein R$^1$, R$^2$ and R$^3$ are as defined in claim 1 or a pharmaceutically acceptable acid addition salt thereof.

6. A composition according to claim 5 in which the active ingredient is 4,6-diamino-2-methylthio-N-methyl-5-pyrimidinesulfonamide.

* * * * *